Nov. 26, 1957 C. B. RICHEY ET AL 2,814,351
SELF-PROPELLED HARVESTER CHASSIS
Filed Oct. 13, 1953 5 Sheets-Sheet 4

INVENTORS
CLARENCE B. RICHEY &
ROBERT E. VANDENBERG
BY E.C. McRae
J.R. Faulkner
W.A. Schaich
ATTORNEYS

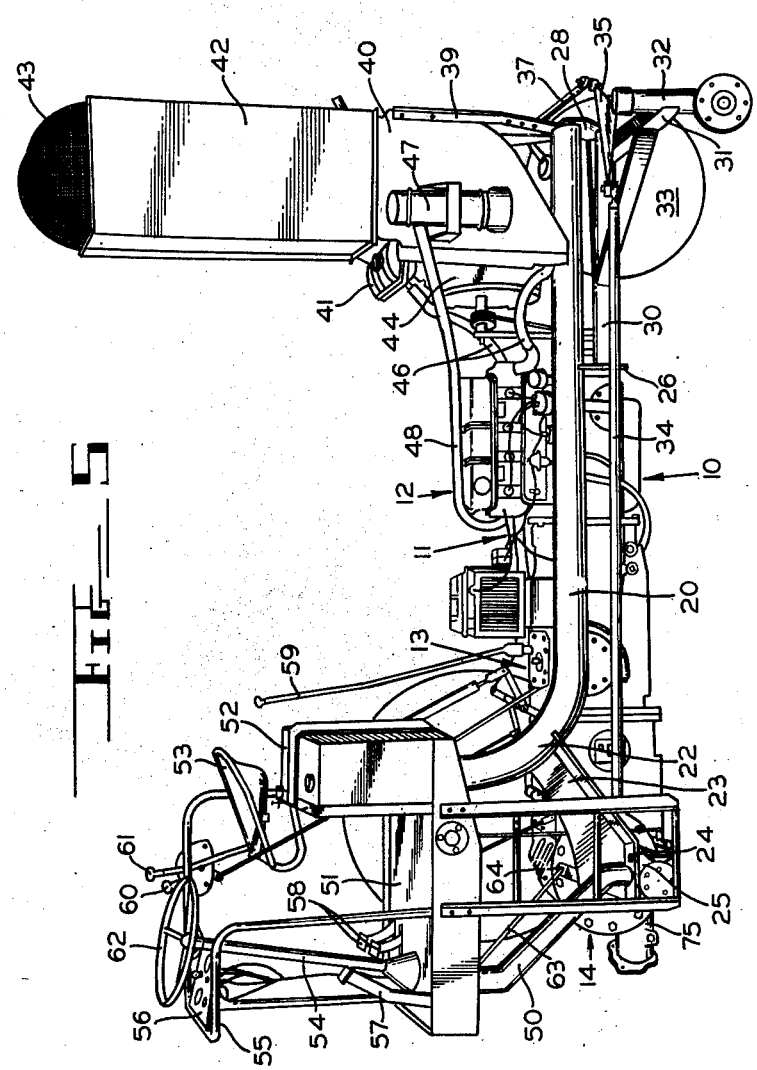

United States Patent Office 2,814,351
Patented Nov. 26, 1957

2,814,351

SELF-PROPELLED HARVESTER CHASSIS

Clarence B. Richey and Robert E. Vandenberg, Royal Oak, Mich., assignors to Ford Motor Company, Dearborn, Mich., a corporation of Delaware Application October 13, 1953, Serial No. 385,858

4 Claims. (Cl. 180—1)

The present invention relates to a self-propelled harvester chassis and more particularly to a modified farm tractor chassis suitable for use as a prime mover for a harvesting machine.

Recently, much interest has been evident in the development of a self-propelled chassis adapted to carry and power several different types of harvesting machines. However, such previously proposed chassis have been specially designed and built for this specific purpose. The high cost of these specially designed units, due to low volume production, has been one of the main deterrents in the development of this type of harvesting equipment.

The present invention now proposes the utilization of a modified farm tractor as a harvesting chassis. The tractor engine, transmission, final drive, and wheels remain as on the tractor, while the only modifications necessary are the extension of the wheel base, the addition of a driver's platform, and the provision of a supporting framework for carrying the harvester. The harvester chassis as disclosed in the present application proposes novel wheel base extension means and a novel harvester carrying frame which serves to tie together the chassis components including the chassis rear axle, engine and the extended chassis front axle.

It is, therefore, an important object of the present invention to provide an improved self-propelled harvester chassis.

Another important object is the adaptation of a production from tractor chassis for use in carrying and powering a harvesting unit.

It is a further important object to provide a modified farm tractor provided with a supporting framework which effectively ties together the chassis components and which serves to at least partially support a harvesting machine upon the chassis.

Still another object of the present invention is the provision of a harvester chassis for extending the wheel base of a conventional farm tractor and tying together tractor components by a single main frame element.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 5 is a side prospective view with all but one of the chassis wheels removed for clarity of illustration;

Figure 6 is a sectional view, with parts shown in elevation, taken along the plane 6—6 of Figure 1.

As shown on the drawings:

Figure 1:
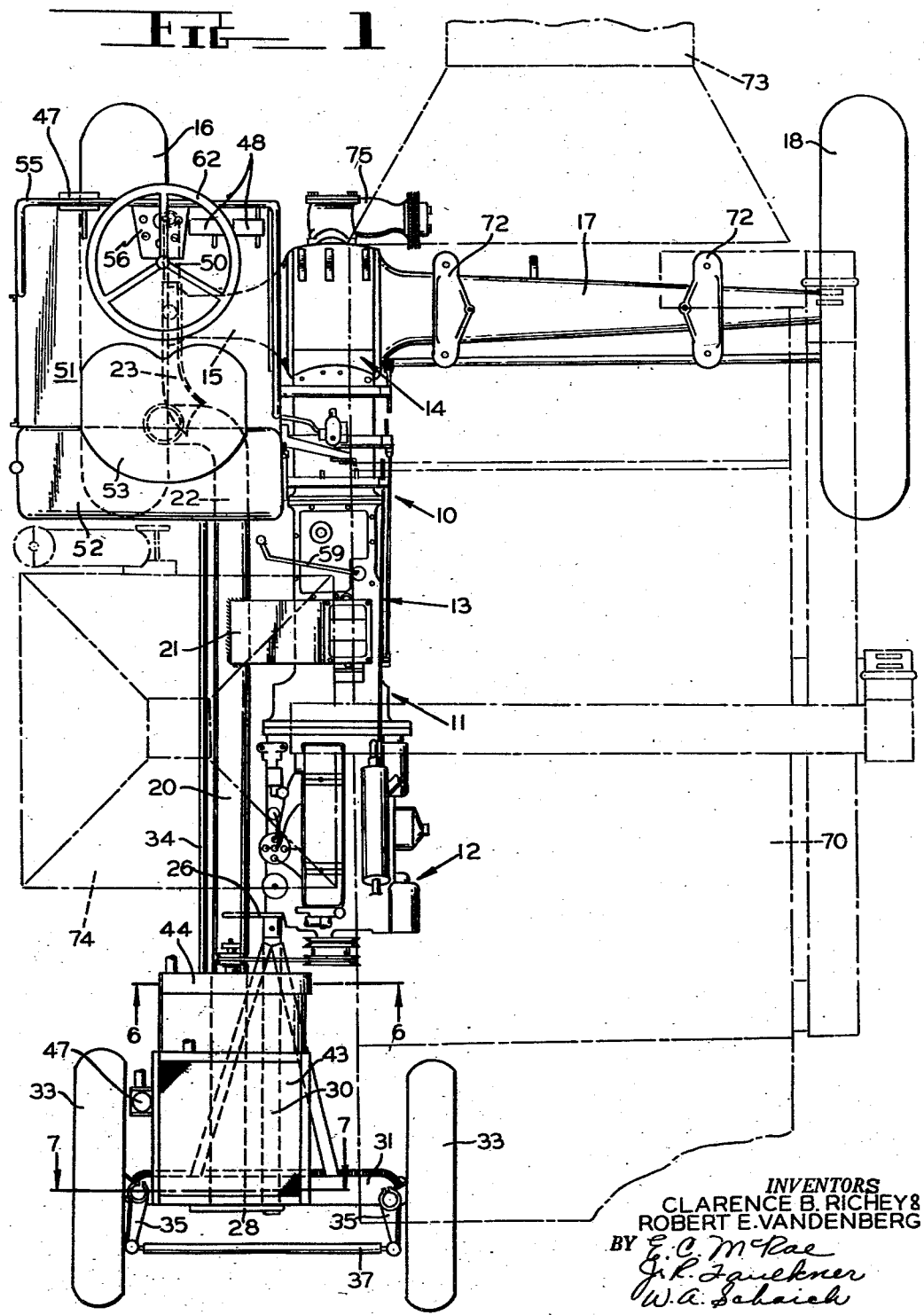
Figure 1 is a plan view of self-propelled harvester chassis of the present invention, the harvester components being illustrated in dotted outline.

In Figure 1 reference numeral 10 refers generally to a self-propelled harvester chassis of the present invention. The chassis 10 includes a main body portion 11 comprising a longitudinally aligned engine block 12, transmission case 13, and differential housing 14, standard components of a conventional farm tractor. The differential housing 14 carries a conventional left hand axle housing 15, enclosing the usual driving axle drivingly connected to a driving wheel 16.

The differential housing 14 also carries a laterally extended, axially elongated right hand axle housing 17 enclosing an elongated axle carrying the right hand driving wheel 18. It will be noted that the direction of travel of the conventional tractor has been reversed, so that the drive wheels 16 and 18 become the front wheels.

Extending longitudinally along the left hand side of the engine block 12, the transmission case 13, and the differential housing 14 is an elongated, tubular, main supporting frame or beam 20. The main beam 20 is supported medially by a supporting gusset 21 (Figures 1 and 2) secured to the transmission case 13 by suitable means, as by bolts. The forward portion of the beam 20 is curved forwardly and upwardly, as at 22, and this forward portion 22 is reinforced by curved brace 23 welded or otherwise rigidly joined to the portion 22 of the beam 20 and secured by bolts 24 to an attachment boss 25 integral with the left hand axle housing.

Figure 4:
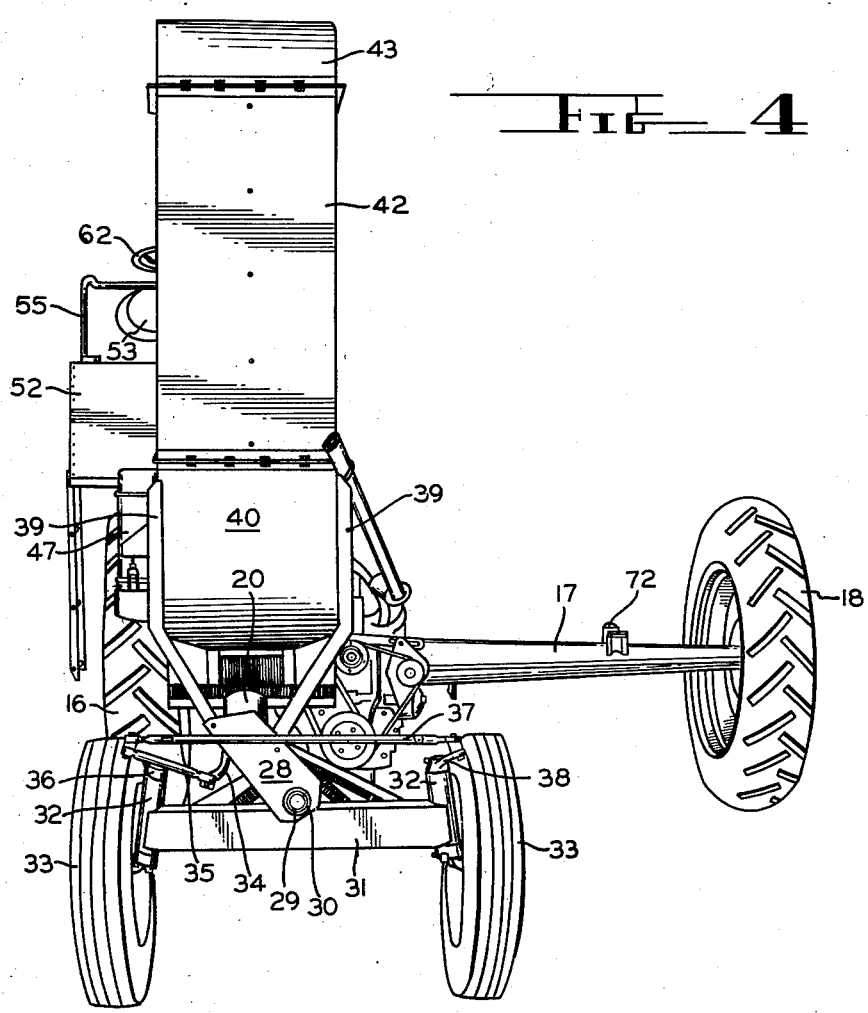
Figure 4 is a rear prospective view.
Figure 7:
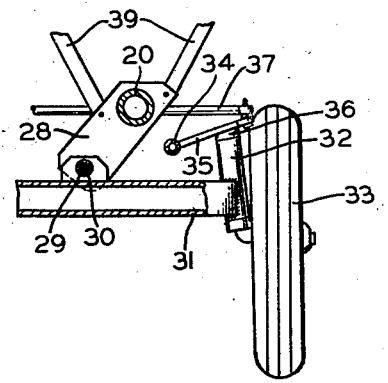
Figure 7 is a sectional view, with parts shown in elevation, taken along the plane 7—7 of Figure 1.

The rear portion of the beam is secured to the engine block 12 by a laterally and downwardly extending carrying plate 26 (Figures 5 and 6) bolted to the engine block, as at 27. The free rear end of the beam 20 carries a downwardly and inwardly extending supporting plate 28 rigidly secured thereto (Figures 4 and 7). The plates 26 and 28 are joined by a longitudinally extending tubular shaft 29 which is rigidly secured between the plates to extend longitudinally of the tractor therebetween. This fixed shaft 29 is surrounded by a pivot tube 30 which supports a laterally extending front axle 31 of rectangular box-like construction. The transverse front axle structure 31 is thus rotatable with the sleeve 30 and is supported for relative tilting movement with respect to the remainder of the chassis.

The axle 31 carries at each lateral extremity a king pin sleeve 32 which is laterally and vertically inclined for proper steering wheel camber and castor, and the sleeve 32 journals therein a king pin supporting the corresponding steering wheel assembly 33. The steering wheel assemblies 33 are steerable through a drag link 34 extending generally longitudinally of the tractor beneath the beam 20 and joined through a radius arm 35 to the king pin boss 36, of the left steering wheel 33 and through a transverse steering bar 37 to the right hand wheel steering arm 38.

The plate 28 at the rear of the beam 20 also carries a pair of upwardly extending members 39 and the beam 20 forwardly of the plate carries an upstanding air inlet housing 40 bracked by the member, 39. The air inlet housing 40 encloses the engine radiator 41, and the housing is surrounded by an inlet stack 42 extending vertically above the chassis to carry an air filter screen 43. The housing 40 and the stack 42 insure the provision of clean, dust-free air for the radiator and air circulating efficiency is promoted by a plenum ring 44 partially closing the engine fan 45. Coolant circulation from the radiator 41 to the engine 12 is accomplished through conduits 46, and an air cleaner 47 is mounted on the housing 40 for communication with the carburetor through conduit 48.

The forward end 22 of the beam 20 extends generally vertically upwardly to terminate above and slightly rearwardly of the left hand axle housing 15. A tubular strut 50 is mounted on the mounting pad 25 to extend forwardly and upwardly therefrom in general longitudinal alignment with the forward end of the beam 20. The strut 50 and the forward end of the beam 20 cooperatively support thereon a driving platform 51 upon which is supported a gas tank 52, an operator's seat 53, a steering post 54, and a guard rail 55 carrying an instrument panel 56.

The transmission clutch is actuated by a clutch pedal 57 located above the platform 51 while individual brake pedals 58 control the brakes for the front driving wheels 16 and 18. A transmission shift lever 59 is provided for shifting the transmission gears, and a manual throttle arm 60 and a hydraulic system actuating arm 61 are provided within easy reach of an operator occupying the seat 53. The steering column 54 is surmounted by a steering wheel 62 which is connected through arm 63 and medially pivoted lever 64 to the drag link 34.

Figure 2:
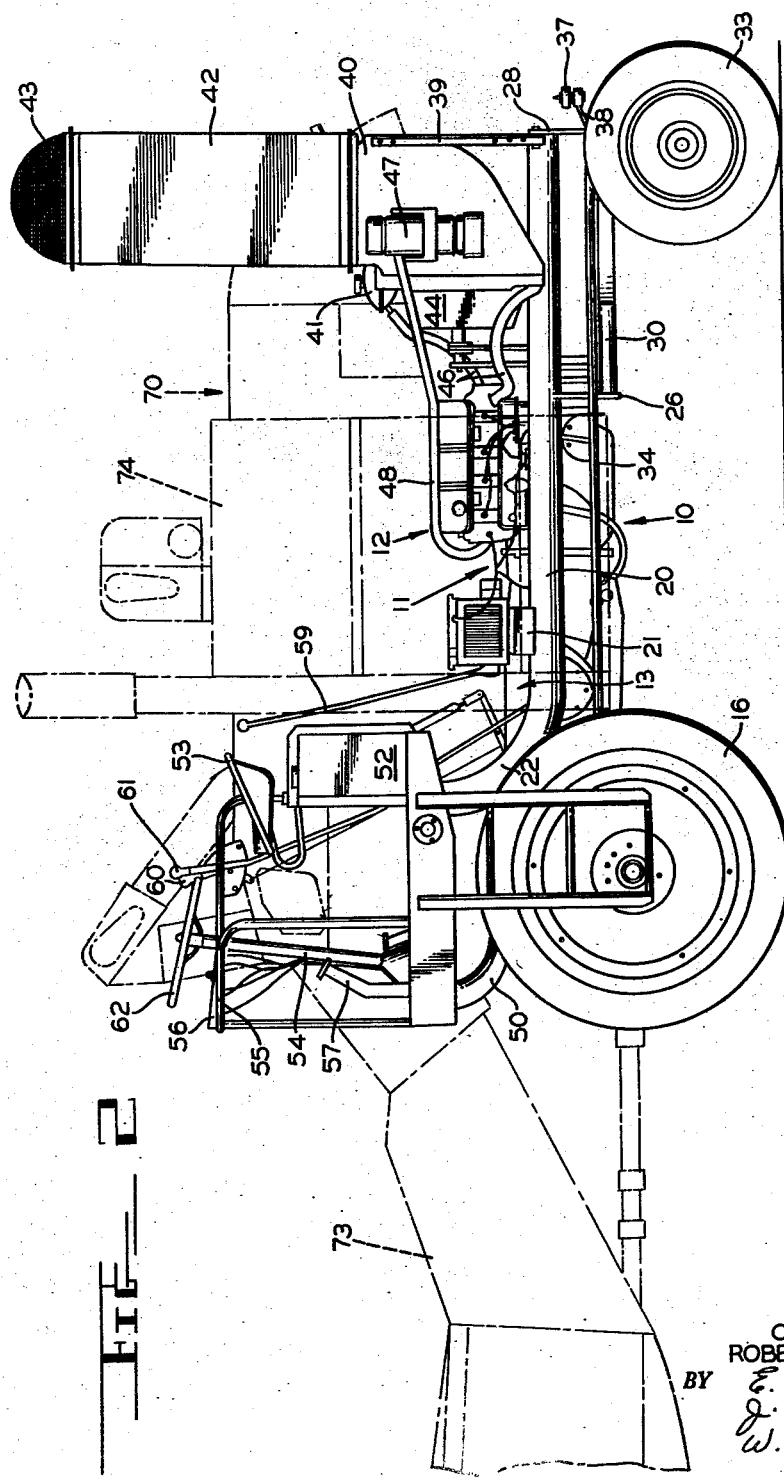
Figure 2 is a side elevation of the chassis of Figure 1, the harvester being again shown in dotted outline.
Figure 3:
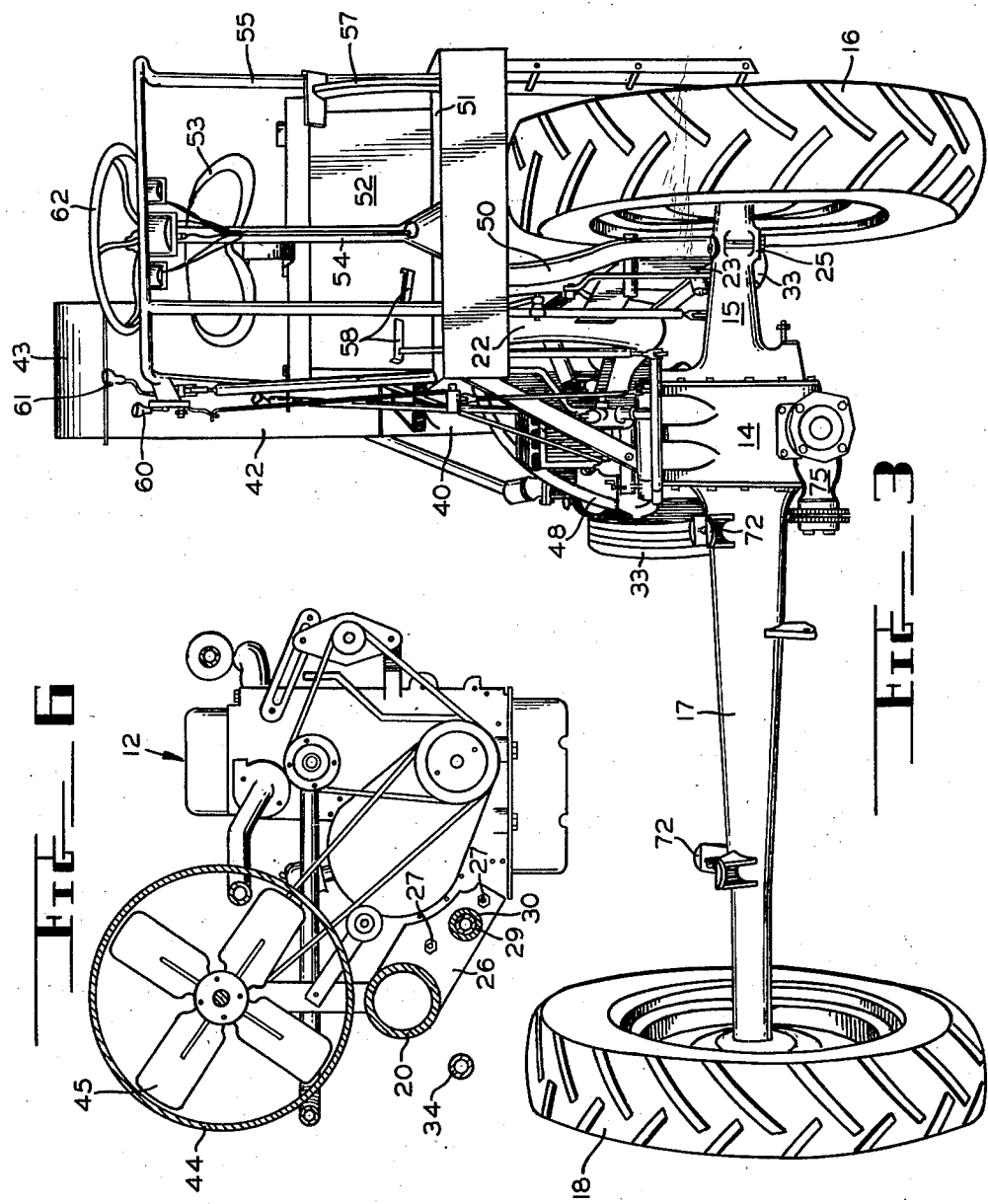
Figure 3 is a front prospective view of the harvester chassis.

As illustrated in Figures 1 and 2, the chassis is adapted to receive therein a harvesting machine such as a combine 70 shown in dotted outline. The threshing components of the combine 70 are of course contained within the combine body which is secured to a pair of laterally spaced mounted pads 72 rigidly mounted upon the elongated right hand trumpet housing 17. The combine header 73 extends forwardly of the driving axle and has a cutting width sufficient to laterally cover the tread of the driving wheels 16 and 18. The grain tank 74 of the combine is carried by the main beam 20 on the left hand side of the engine 12 and transmission case 13. Power for driving the combine is taken from the power take off shaft at the forward end of the differential housing 14 as through an angle drive 75.

Thus, it would be appreciated that the present invention provides a new and novel type of harvester chassis which utilizes most of the components of the conventional farm tractor. The operator's platform and the extended front axle of the chassis are secured to the main body by means of the longitudinally extending beam 20 and the beam also serves to counterbalance the weight of the combine body 70 with the combine grain tank 74.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a chassis for a self-propelled harvester utilizing standard tractor components, a longitudinally aligned engine, transmission case, and differential housing secured together to form a rigid, unitary structure with the differential housing at its forward end, axle housings extending from opposite sides of the differential housing, one of said axle housings being substantially longer than the other of said axle housings, driving wheels rotatably carried by the axle housings, a longitudinal frame member extending parallel and rigidly secured at intervals to the unitary structure, said frame member being laterally offset from the unitary structure on the same side as the shorter axle housing and extending rearwardly from adjacent the differential housing to a zone beyond the engine, a transverse axle carried by the rear end of the frame member, steerable wheels mounted on the ends of said axle, and an operator's platform supported by the forward end portion of the frame member.

2. In a chassis for a self-propelled harvester utilizing standard tractor components, a longitudinally aligned engine, transmission case, and differential housing secured together to form a rigid, unitary structure, axle housings extending from opposite sides of the differential housing, one of said axle housings being substantially longer than the other of said axle housings, driving wheels rotatably carried by the axle housings, a longitudinal frame member extending parallel and rigidly secured at intervals to the unitary structure, said frame member being laterally offset from the unitary structure on the same side as the shorter axle housing and extending from adjacent the differential housing to a zone beyond the engine, a transverse axle mounted on the engine end of the frame member, and steerable wheels mounted on the ends of said axle.

3. In a chassis for a self-propelled harvester utilizing standard tractor components, a longitudinally aligned engine, transmission case, and differential housing secured together to form a rigid, unitary structure with the differential housing at its forward end, axle housings extending from opposite sides of the differential housing, one of said axle housings being substantially longer than the other of said axle housings, driving wheels rotatably carried by the axle housings, a longitudinal frame member extending parallel and rigidly secured at intervals to the unitary structure, said frame member being laterally offset from the unitary structure on the same side as the shorter axle housing and extending rearwardly to a zone beyond the engine, a transverse axle carried by the rear end of the frame member, steerable wheels mounted on the ends of said axle, and a driving platform located generally above the shorter axle housing.

4. In a chassis for a self-propelled harvester utilizing standard tractor components, a longitudinally aligned engine, transmission case, and differential housing secured together to form a rigid, unitary structure with the differential housing at its forward end, axle housings extending from opposite sides of the differential housing, one of said axle housings being substantially longer than the other of said axle housings, driving wheels rotatably carried by the axle housings, a longitudinal frame member extending parallel and rigidly secured at intervals to the unitary structure, said frame member being laterally offset from the unitary structure on the same side as the shorter axle housing and extending rearwardly to a zone beyond the engine, a transverse axle supported from the rear end of the frame member for rocking movement about a central pivot extending longitudinally of the unitary structure, steerable wheels mounted on the ends of said axle, and a driving platform located generally above the shorter axle housing.

References Cited in the file of this patent

UNITED STATES PATENTS

| | | |
|---|---|---|
| 1,275,123 | Brown | Aug. 6, 1918 |
| 2,039,460 | Smith | May 5, 1936 |
| 2,240,236 | Aitken | Apr. 29, 1941 |
| 2,345,351 | Maxon et al. | Mar. 28, 1944 |
| 2,513,942 | Johnson et al. | July 4, 1950 |
| 2,524,083 | Ronning | Oct. 3, 1950 |
| 2,540,249 | Evers et al. | Feb. 6, 1951 |
| 2,641,887 | Korsmo et al. | June 16, 1953 |